No. 674,917. Patented May 28, 1901.
W. G. HALBERT.
DUMPING CAGE.
(Application filed Mar. 2, 1901.)
(No Model.) 3 Sheets—Sheet 3.
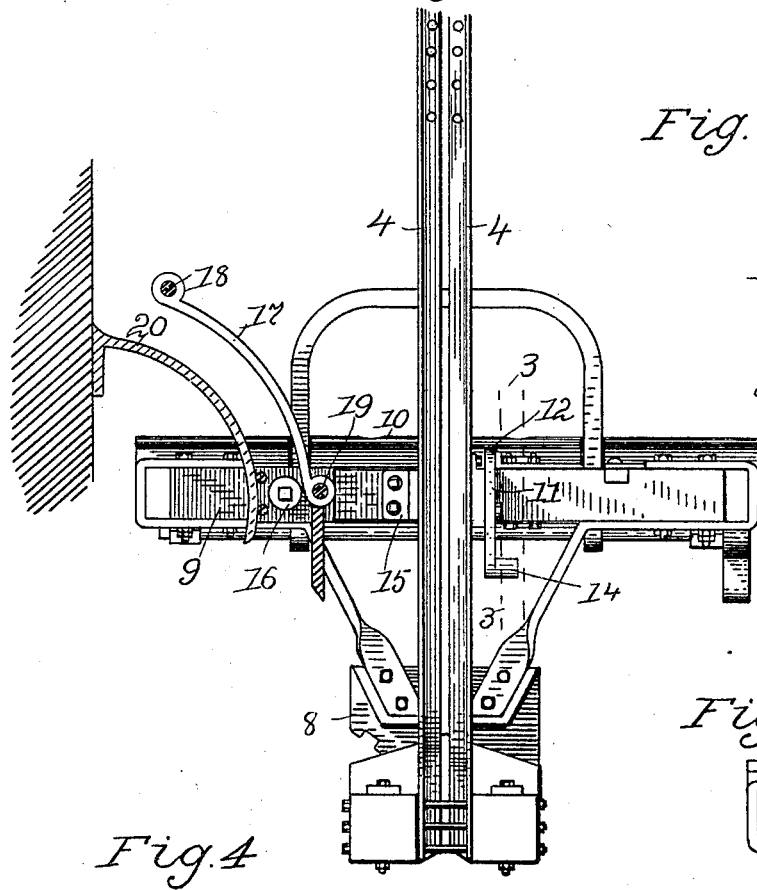
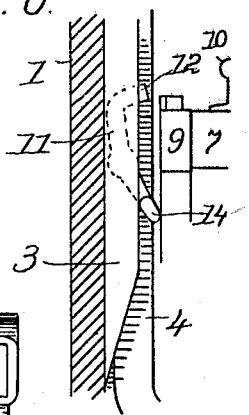
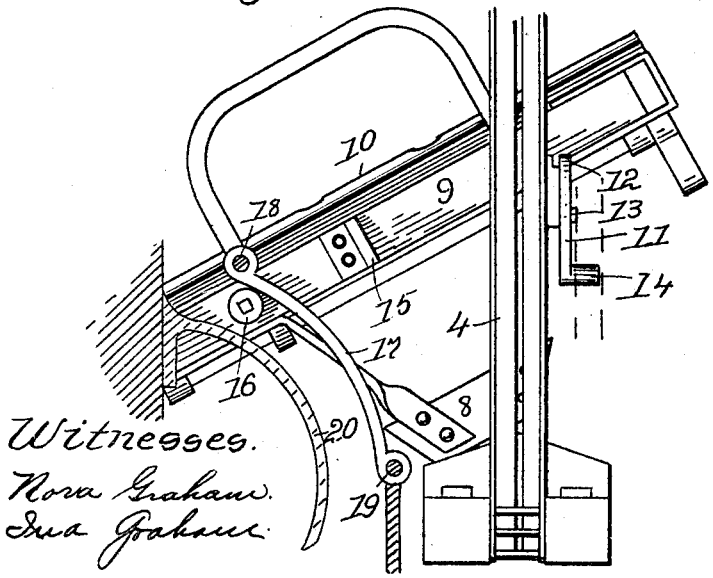
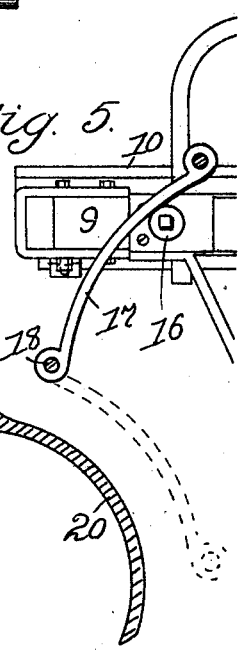
Witnesses.
Nora Graham.
Ina Graham.
Inventor
Wm. G. Halbert.
by L. P. Graham
his attorney.

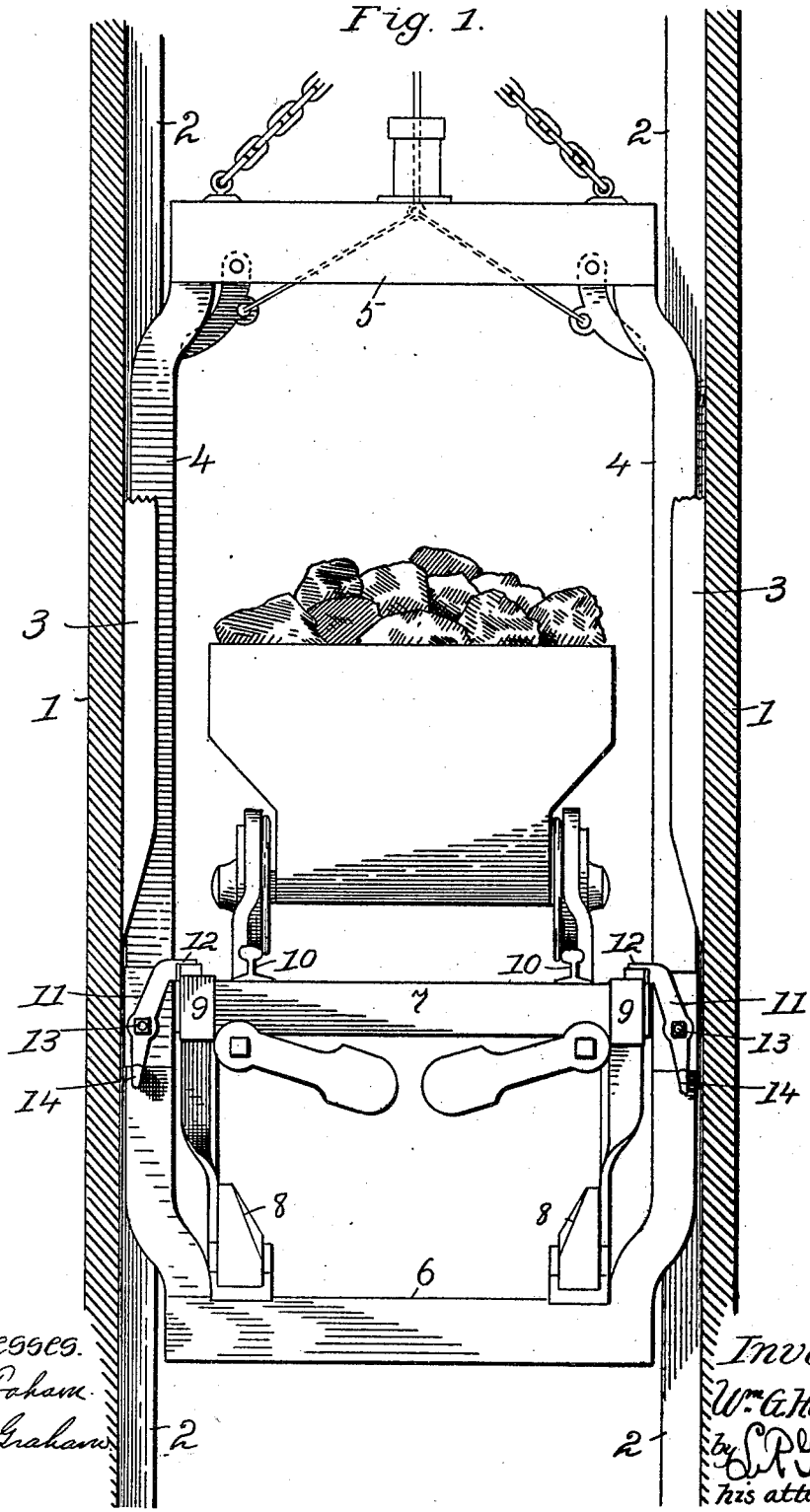

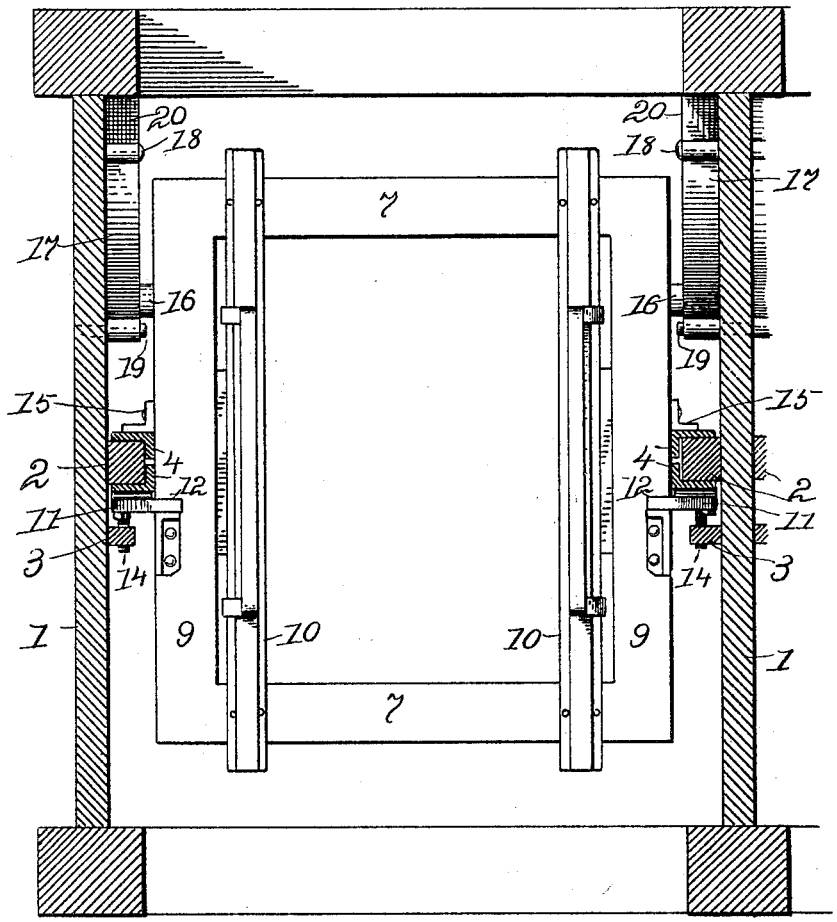

UNITED STATES PATENT OFFICE.

WILLIAM G. HALBERT, OF WESTVILLE, ILLINOIS.

DUMPING-CAGE.

SPECIFICATION forming part of Letters Patent No. 674,917, dated May 28, 1901.

Application filed March 2, 1901. Serial No. 49,534. (No model.)

*To all whom it may concern:*

Be it known that I, WILLIAM G. HALBERT, of Westville, in the county of Vermilion and State of Illinois, have invented certain new and useful Improvements in Dumping-Cages, of which the following is a specification.

This invention provides a cage that runs freely on its guides without any tendency to cramp thereon and that dumps its load automatically when the top of the shaft is reached. It is particularly applicable to coal-hoisting cages, and it is exemplified in the structure hereinafter described.

In the drawings forming part of this specification, Figure 1 is an elevation of a cage embodying my improvements, portions of the shaft-walls being shown in cross-section. Fig. 2 is a plan of the frame of the cage and the tilting platform thereon, the shoes that run on the guides being shown in section. Fig. 3 is a detail in side elevation, showing the means employed to tilt the platform. In this figure the tilting inclines are shown detached from the shaft-wall, so as to make them more conspicuous. Fig. 4 is a side elevation illustrative of a tilting operation. Fig. 5 is a detail showing an ineffectual attempt to tilt the platform and illustrating the means used to prevent damage to the cage or the tipple in case the platform should not be released previous to encountering the tilting inclines. Fig. 6 is a detail illustrating the means used to hold the platform from tipping while the cage is traveling to and from the tipple and showing how the platform is released when the tipple is reached.

The walls of the shaft are represented in a general manner at 1, and the vertical guides for the cage are shown at 2. At 3 are shown bars or strips secured to the walls of the shaft and extended into the paths of arms on platform-securing levers. The strips 3 are beveled at their lower ends to form inclined operative surfaces, and they extend parallel with the guide 2. The upright side bars 4 of the cage constitute elongated shoes, which embrace the sides of the guides for nearly their entire lengths. The shoes are preferably made each of a pair of angle-bars, and they are connected at their upper ends with a cross-frame, as 5, and at their lower ends with a cross-frame, as 6.

The dump-platform may be constructed in any desirable manner consistent with its purpose, and it is in this instance represented in a general way by cross-bars 7 and side bars 9. The platform is tiltable endwise on rocking bearings 8 or their equivalent, and it is supplied with rails 10, on which the coal-cars are held in the customary way.

Levers 11 are pivoted at 13 on the sides of the shoes 4 opposite the discharge end of the platform, and their upper ends are hooked inward, as shown at 12, and adapted to engage the side bars 9 of the tilting platform when such platform is in a horizontal position. At the lower ends of the levers trip-arms 14 extend sidewise in position to strike the inclined surfaces of bars 3 and be turned aside thereby. Brackets 15 are attached to the side bars 9 of the platform in position to strike the shoes when the platform is horizontal and hold the platform against further backward tilt, and when the hooked ends of the trip-levers are in engagement with the platform the platform is effectually held against forward tilt. Rollers 16 extend sidewise from the forward ends of side bars 9 of the platform, and inclined tilt-bars 17 are secured to the walls of the shaft in position to engage the rollers as the cage reaches the tipple. The tilt-bars are hinged at their upper ends on bolts 18, and at their lower ends they are secured by means of break-pins 19. The pins are strong enough to cause the platform to tilt whenever the lock-levers are released; but if by any chance the lock-levers should retain their engagement with the platform when the rollers engage the trip-inclines the pins will break and prevent damage to the cage or the tipple. (See Fig. 5.)

The upper ends 18 of the trip-bars 17 are sufficiently far from the corner-uprights of the shaft to provide passages for the rollers when the platform is completely tilted, so that the cage may rise above the inclined bars, and bars 20 may extend to the corner-uprights below the trip-inclines and aid in righting the platform as the rollers travel between the two pairs of inclined bars.

The shoes form long bearings against the guides, as hereinbefore mentioned, and they are turned away from the guides gradually at their ends to give them the form of runners. The bearings of the shoes are both above and below the load, and irregular distribution of the load on the platform has no material effect so far as developing friction between the shoes and the guides is concerned.

In operation the cage runs freely up the guides with the platform locked against tilting motion. As the platform nears the tipple the arms 14 strike the inclined ends of stationary bars 3 and carry the hooked ends 12 of levers 11 clear of the side bars of the platform, as shown in Fig. 6. Next the rollers 16 strike the inclined bars 17 and the platform is tilted, as shown in Fig. 4.

I claim—

1. A dumping-cage comprising an upper cross-frame, a lower cross-frame, vertical shoe-bars connecting the lower cross-frame with the upper cross-frame and embracing the guides of the shaft, a tilting platform supported on the lower cross-frame, levers pivoted on the shoes on the sides thereof opposite the discharge end of the platform, such levers having hooked ends to engage the platform and also having laterally-extended trip-arms, and stationary inclines to engage the trip-arms of the levers and disengage the levers from the platform.

2. In a dumping-cage, the combination of shoes slidable on the shaft-guides, a platform tiltable between the shoes, brackets on the platform to strike against the shoes and prevent the platform from swinging backward beyond the horizontal, lock-levers on the sides of the shoes opposite the discharge end of the platform, such levers having bent ends adapted to engage the platform, stationary inclines for detaching the lock-levers from the platform, rollers on the sides of the forward end of the platform and stationary inclines to engage the rollers and tilt the platform.

3. In a dumping-cage the combination of a tiltable platform, releasable locks to hold the platform horizontal, means for releasing the locks, rollers on the sides of the forward part of the platform and inclined trip-bars to engage the rollers, such trip-bars being held in place by break-pins, substantially as described.

In testimony whereof I sign my name in the presence of two subscribing witnesses.

WILLIAM G. HALBERT.

Witnesses:
E. R. KNOX,
JOHN W. BARGER.